EASILY OPENABLE SEALED PLASTIC CLOSURE AND METHOD

Original Filed July 8, 1969 2 Sheets-Sheet 1

Inventor
John S. Song
By Darbo, Robertson & Vandenburgh
Attorneys

EASILY OPENABLE SEALED PLASTIC CLOSURE AND METHOD

Original Filed July 8, 1969 2 Sheets-Sheet 2

Inventor
John S. Song
By Darbo, Robertson & Vandenburgh
Attorneys

United States Patent Office

Re. 27,611
Reissued Apr. 3, 1973

27,611
EASILY OPENABLE SEALED PLASTIC CLOSURE AND METHOD

John S. Song, Addison, Ill.
(2 Williamsburg Circle, Evanston, Ill. 60203)

Original No. 3,567,061, dated Mar. 2, 1971, Ser. No. 839,973, July 8, 1969. Application for reissue Apr. 21, 1971, Ser. No. 136,133
Int. Cl. B65d *17/00*
U.S. Cl. 220—27 9 Claims

Matter enclosed in heavy brackets [ ] appears in the original patent but forms no part of this reissue specification; matter printed in italics indicates the additions made by reissue.

ABSTRACT OF THE DISCLOSURE

The "score" line in a plastic wall, provided to define a line of comparatively easy tearing, is brought to a point at one side of an abutment integral with said wall. A handle is provided on the plastic in the area within the score line and immediately adjacent the point. Pulling on the handle applies a force at the point at which a tear will commence and continue along the score line. Because the score line comes to a point outside the plane of the wall it will more readily tend to break at that point rather than merely stretch. This tendency is enhanced by a notching of the score line at the terminus of the point.

BACKGROUND OF THE INVENTION

Pull tab type openers are extensively used in metal containers. A pulling on the tab breaks the metal along a score line, with the remainder of the metal along the score line being torn by continued pulling on the tab. There are many potential applications for a similar arrangement with containers having a plastic wall. These have not come into use because of the difficulty in obtaining an initial breaking of the plastic when the pull is first applied. Once the plastic is broken, it may tear relatively easy, but the initial breaking of the plastic can be extremely difficult. This discussion, of course, refers to such plastics as would be suitable for containers because of their physical characteristics, principally, strength and toughness sufficient to provide a secure container. Examples of such plastics are polypropylene and polyethylene.

It is recognized that the removed metal closures from pull tab metal containers have sharp edges. When they are discarded, as for example on a swimming beach, there is a danger that people will be cut by coming into contact with them. This would not be the case with respect to plastic closures. The use of plastic for containers can have numerous other advantages over metal, for example, the ability to see the contents within the container. There is also a favorable cost factor.

Some producers have endeavored to use containers having a wall with a removable plastic closure therein. Upon encountering the above described difficulty in starting the tearing along the "score" line, they have provided breaks in the wall at the starting end of the score line so that the wall is thus weakened and will tear more readily. Obviously, this is an unsatisfactory solution for containers intended to hold a liquid or a material which is to remain sealed before use. The fact is that, because of these openings made to weaken the wall, the container just is not closed.

The principal object of the present invention is to provide a method and apparatus by which a container may be provided with a sealed plastic wall, while at the same time allowing an easy initial separation of the plastic along a score line.

SUMMARY OF THE INVENTION

The present invention relates to a method and apparatus by which a score line in a plastic wall can be initially torn with a comparatively moderate force applied thereto.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements or combinations in which the inventive concepts are found.

Figure 1:
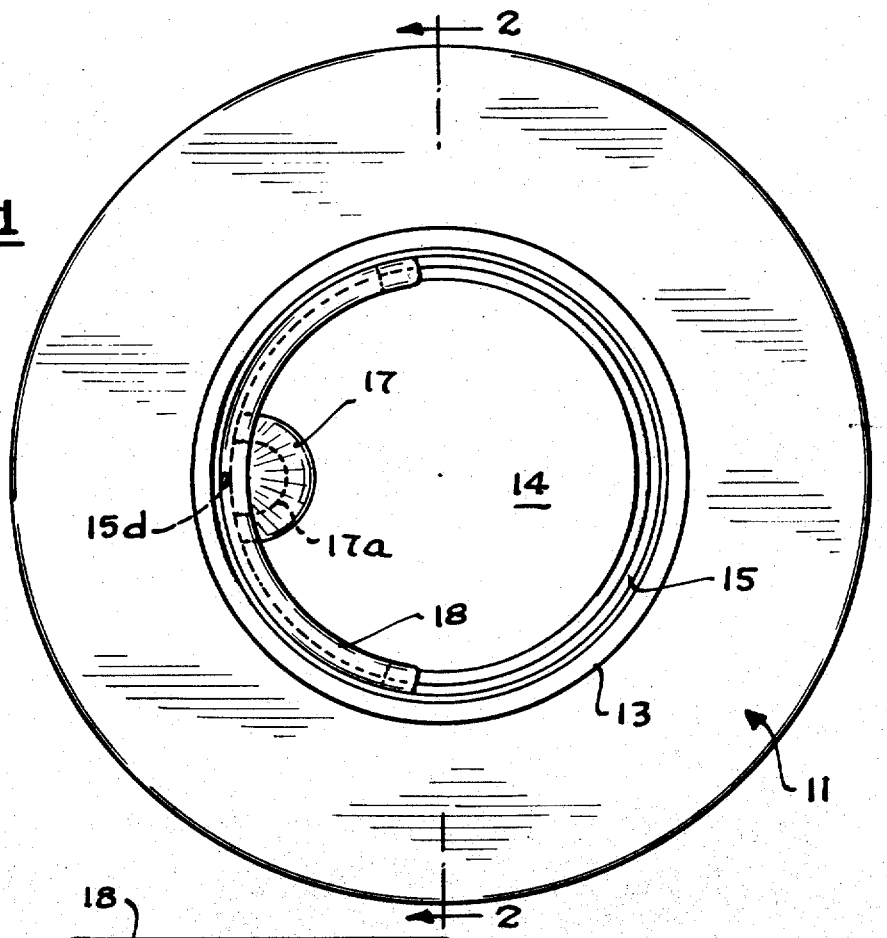
FIG. 1 is a plan view of an embodiment of the invention.
Figure 2:
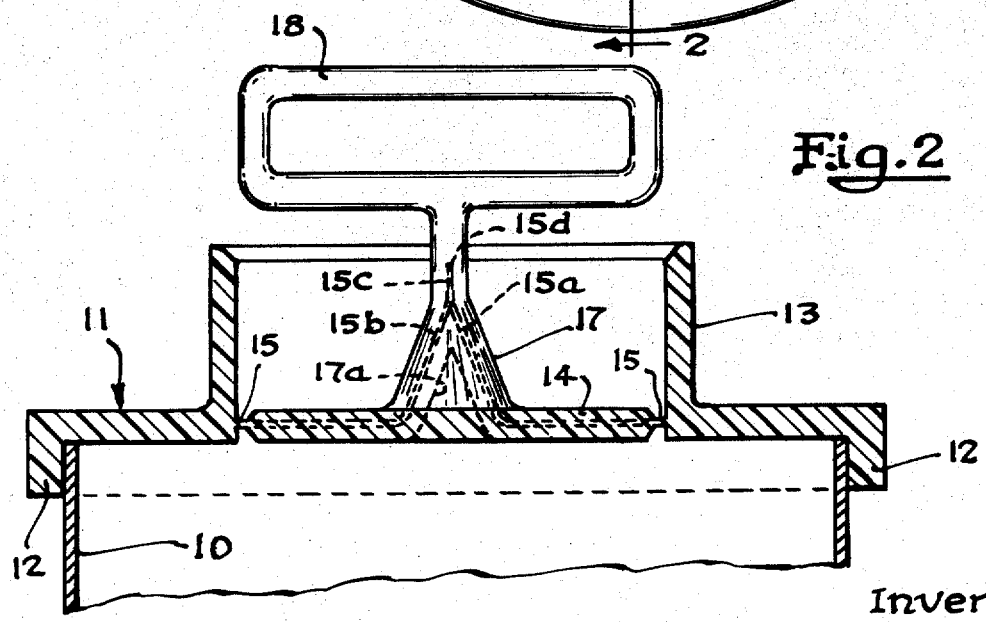
FIG. 2 is a section viewed at line 2—2 of FIG. 1.

FIGS. 1 and 2 illustrate the upper end of a container having cylindrical metal sidewalls 10, a plastic top generally 11, and a bottom (not shown). Top 11 includes a flange 12 secured to the sidewalls 10 as by means of an adhesive which provides a fluid seal. The top extends upwardly into a ring 13 which forms a pouring spout. Within ring 13 is an area 14 which forms a closure and includes thin section 15 connecting the closure to the remainder of the top.

The thin section 15 forms what is best referred to as a "score" line. The term "score" is sometimes used in a restricted sense to indicate a thin section that has been formed by a cutting operation. However, in its broad sense and as used herein, the term "score" is employed to refer to a correspondingly thin section formed in any manner whatsoever. It will be readily apparent to those skilled in the art that in manufacturing a plastic cap, such as that illustrated and described, the thin section would preferably be produced during the molding, but could be produced by a cutting operation after the cap is otherwise completed.

At one side of closure 14 it has a boss 17 integral with the closure and forming a part thereof. Boss 17 has a hollow interior 17a. Between boss 17 and the adjacent inner wall of ring 13 the score line 15 extends upwardly as two separate lines 15a and 15b. These two then merge into a single line 15c having an upper terminal end 15d. Boss 17 extends on upwardly beyond ring 13 to form a handle 18.

Ring 13 forms an abutment extending upwardly from the main surface of top 11. When the container is held with one hand this abutment remains relatively stationary. If the other hand then grasps handle 18 and pulls it in a direction away from that part of the abutment to which the score line 15c connects, the score line at its terminal end 15d will tear relatively easily. Once the tearing commences it will then easily continue down the length of the single score line 15c and into the dual score lines 15a and 15b. From here it will proceed around the inner wall of ring 13 until it is completely torn and the closure 14 becomes removable from the remainder of the top 11.

The principle upon which the present invention operates can easily be demonstrated by taking a sheet of relatively strong plastic film (or even relatively weak for that matter) and attempting to tear it commencing somewhere in the central area of the sheet. If the sheet is grasped between the fingers of one hand and between the finger of the other and an effort made to move the two hands apart, it will be found that the sheet is very difficult to tear. It may stretch, but tear it doesn't want to do. If the same sheets is then grasped along one of the side edges and an effort made to tear it commencing at the edge, it will be found that the sheet tears quite readily. The structure of the present invention is such that the terminal end 15d, in effect, corresponds to the edge of the sheet. With the tearing force commencing at this "edge," the plastic can be torn without undue difficulty. Once the tearing commences it will continue throughout the remaining length of the score line, including its merging branches 15a and 15b.

Where the thickness of the score line 15 is relatively thick and/or the plastic material employed is relatively tough, it is likely to be necessary to form the terminal end 15d in a manner such that it comes to a point. With the terminal end coming to a point, the force (caused by the pulling) acting to cause the initial tearing of the plastic will be applied on a relatively thin section. Thus the tearing is easier to start. Once it starts, of course, a continuation of the tearing can be performed with little difficulty. FIGS. 3–8 illustrate different manners in which the terminal end 15d can be formed with such a pointed, thin section.

Figure 3:
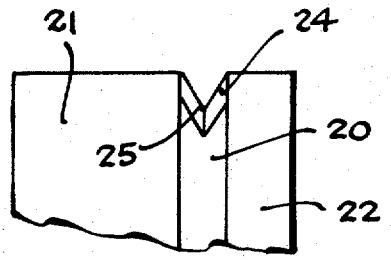
FIG. 3 is a diagrammatic elevational view of the terminal end of the score line.
Figure 4:
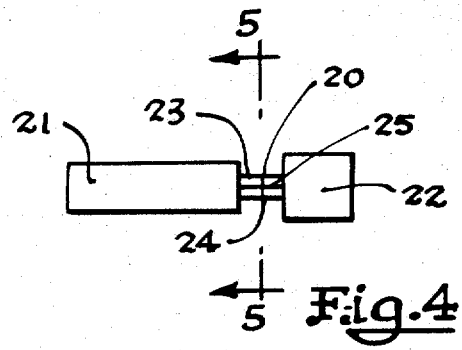
FIG. 4 is a plan view of the structure of FIG. 3.
Figure 5:
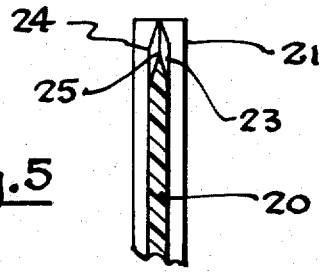
FIG. 5 is a section as viewed at line 5—5 of FIG. 4.

Referring to FIGS. 3–5, there is illustrated a score line 20 between an enlarged section 21 (which for the purpose of convenience may be referred to as a handle) and an enlarged section 22 (which may be referred to as an abutment). Score line 20 is of uniform thickness. At its upper end it has V-shaped tapers 23 and 24 on opposite sides so that the score line comes to a sharp point at 25. The score line 20 corresponds to single line 15c of FIGS. 1 and 2 and point 25 corresponds to the terminal end 15d. When handle 21 at abutment 22 are pulled away from each other (particularly adjacent the top thereof), a tearing force is applied which will readily commence the tearing of the plastic at point 25.

Figure 6:
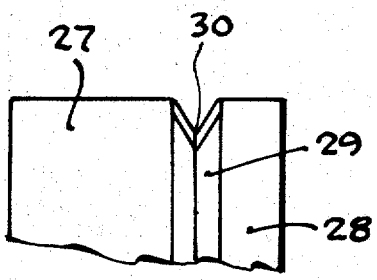
FIG. 6 is an elevational view of a modified form of the terminal end of the score line.
Figure 7:
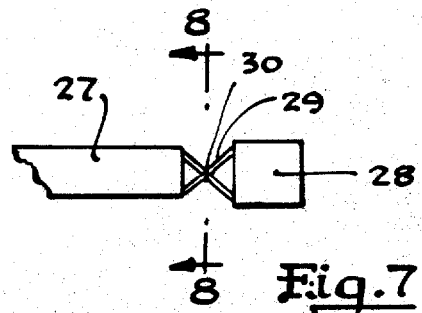
FIG. 7 is a plan view of the structure of FIG. 6.
Figure 8:
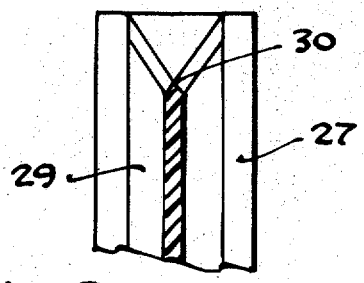
FIG. 8 is a section as viewed at line 8—8 of FIG. 7.

In the embodiment illustrated in FIGS. 6–8, there is a handle 27 and an abutment 28 (or vice versa). The score line 29 therebetween is not of uniform cross section, but is thicker adjacent the handle and abutment than it is midway therebetween (as best seen in FIGS. 7 and 8). The distal end of the score line is formed with a V-shaped notch so that it comes to a point 30. Again, the fact that the terminal end of the score line comes to a point facilitates the initiation of the tearing of the score line. It will be noted that in all of these embodiments the terminal end of the score line is out of the surface defined by the main portion of the enclosure, i.e., any differential in pressure that may exist between the interior and the exterior of the container across the score line does not apply a force at the terminal end of the score line.

From the foregoing description, innumerable modifications and variations in embodiments utilizing the invention will be apparent to those skilled in the art. The whole container may be formed of plastic. Alternatively the plastic area in which the removable closure appears may be only an insert in a portion of one wall of the container. Such an insert could be attached to the remainder of the container in diverse ways. The "abutment" and "handle" could be of innumerable configurations. The important point here is that there are two relatively strong sections (connected by a thin section) between which a separating force can be applied to tear the score line. The "abutment" can function as a handle and vice versa. A ring shaped pouring spout 13 is not necessary to define the abutment. The score line need not be a continuous line, but could be two separate lines which ultimately converge as do the score lines 15a and 15b. In that event, the closure, instead of being completely removed from the wall of the container would be only partially separated so that it would remain in place but could be bent back to allow the removal or replacement of contents from the container. The particular angle at which the score lines (e.g. 15a and 15b) converge is not critical. The length of the single line 15c beyond the point of convergence is not of any critically so far as the operation of the invention is concerned, but may be dictated by other factors involved in a particular application of the invention.

I claim:

1. An easily openable sealed closure arrangement for a container having a wall area of plastic of a given thickness, said arrangement comprising:

an abutment of said plastic projecting outwardly from said wall and integral with the wall;

said wall having a portion extending up a side of the abutment and contiguous with the abutment;

handle means on said portion;

lines of tear in said wall defined by plastic sections which are substantially less thick than said given thickness, said lines of tear being spaced apart in said area adjacent said side of the abutment and extending outwardly along said side of the abutment between the abutment and said portion with said lines outwardly merging into a single line on said side of said abutment with said single line having a terminus, whereby, when said handle means is pulled in a direction away from said abutment a tearing of said plastic will readily start at said terminus and with additional pulling continue along said lines of tear.

2. A closure arrangement as set forth in claim 1, wherein said line at said terminus is of a V configuration with the point of the V being in the direction of the remainder of the line.

3. A closure arrangement as set forth in claim 2, wherein said abutment is in the form of a ring, said wall extending across the inner face of the ring at the base thereof, said side being a part of the inner face of the ring, said lines extending from said side about the remainder of the inner face of the ring.

4. A closure arrangement as set forth in claim 1, wherein said abutment is in the form of a ring, said wall extending across the inner face of the ring at the base thereof, said side being a part of the inner face of the ring, said lines extending from said side about the remainder of the inner face of the ring.

5. A closure arrangement as set forth in claim 1, wherein said portion is hollow.

6. A closure arrangement as set forth in claim 5, wherein the adjacent parts of said abutment and said portion are substantially normal to the surface defined by said wall area.

7. In the method of forming an easily operable closure in an unbroken plastic wall area defining a main surface wherein the closure is defined by a "score" line with a handle means on the portion within the score line so that when the handle means is grasped and pulled the plastic will tear along the line, the improvement comprising:

bringing said score line to a point which point *is* at a location *offset with respect to* [spaced from] said surface so that an end of the score line is exposed; and positioning said handle means immediately adjacent said point;

whereby the pull on the handle means exerts a tearing force at said point which force is at a direction transverse to said line at said point so that the plastic at said end will rupture relatively easily.

8. In the method of claim 7, wherein a notch is formed in said end.

*9. In a closure arrangement for an unbroken plastic wall area defining a main surface wherein the closure is defined by a "score" line with a handle means on the portion within the score line so that when the handle*

*means is grasped and pulled the plastic will tear along the line, the improvement comprising:*

*means forming a part of said plastic wall area for bringing said score line to a point which point is at a location offset with respect to said surface so that an end of the score line is exposed;*

*said handle means being positioned immediately adjacent said point;*

*whereby the pull on the handle means exerts a tearing force at said point which force is at a direction transverse to said line at said point so that the plastic at said end will rupture relatively easily.*

References Cited

The following references, cited by the Examiner, are of record in the patented file of this patent or the original patent.

UNITED STATES PATENTS

| | | | |
|---|---|---|---|
| 3,434,620 | 3/1969 | Lourizo | 220—27 |
| 3,499,572 | 3/1970 | Ruekberg | 220—54 |

GEORGE T. HALL, Primary Examiner

U.S. Cl. X.R.

220—54; 222—541